(12) United States Patent
Liang

(10) Patent No.: US 9,322,985 B1
(45) Date of Patent: Apr. 26, 2016

(54) LIGHT EMITTING STRUCTURE AROUND A KEYBOARD BACKLIGHT MODULE

(71) Applicant: CHICONY POWER TECHNOLOGY CO., LTD., New Taipei (TW)

(72) Inventor: Hsin-Chih Liang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 27 days.

(21) Appl. No.: 14/504,055

(22) Filed: Oct. 1, 2014

(51) Int. Cl.
*F21V 8/00* (2006.01)
*F21V 33/00* (2006.01)
*H01H 13/02* (2006.01)
*F21W 131/30* (2006.01)

(52) U.S. Cl.
CPC .......... *G02B 6/0088* (2013.01); *F21V 33/0004* (2013.01); *G02B 6/0018* (2013.01); *G02B 6/0031* (2013.01); *G02B 6/0083* (2013.01); *H01H 13/023* (2013.01); *F21W 2131/30* (2013.01); *H01H 2219/06* (2013.01); *H01H 2219/062* (2013.01)

(58) Field of Classification Search
CPC .. G02B 6/0088; G02B 6/0018; G02B 6/0031; G02B 6/0083; F21V 33/0004; F21V 2200/00; F21V 2200/10; F21V 2200/13; F21V 2200/20; F21W 2131/30; H01H 13/023; H01H 2219/06; H01H 2219/062
See application file for complete search history.

(56) References Cited

U.S. PATENT DOCUMENTS

| | | | | |
|---|---|---|---|---|
| 2011/0158728 A1* | 6/2011 | Ho | .......................... | H01H 3/125 400/472 |
| 2012/0170306 A1* | 7/2012 | Yao | ....................... | G06F 3/0202 362/602 |
| 2014/0009903 A1* | 1/2014 | Peng | .................... | G02B 6/0021 362/23.03 |
| 2014/0151211 A1* | 6/2014 | Zhang | .................. | H01H 13/702 200/5 A |
| 2014/0204556 A1* | 7/2014 | Tsai | ........................ | H01H 13/83 362/23.03 |
| 2014/0326589 A1* | 11/2014 | Shiu | ....................... | H01H 13/83 200/5 A |
| 2015/0138750 A1* | 5/2015 | Yen | ......................... | H01H 13/83 362/23.03 |
| 2015/0332874 A1* | 11/2015 | Brock | .................. | H01H 13/702 200/5 A |

* cited by examiner

*Primary Examiner* — Bao Q Truong
(74) *Attorney, Agent, or Firm* — Muncy, Geissler, Olds & Lowe, P.C.

(57) ABSTRACT

A light emitting structure around a keyboard backlight module is disclosed to include a light guiding plate comprising a light source, a flat-shape reflecting layer disposed on one side of the light guiding plate, and a transparent film of a light blocking layer disposed on other side of the light guiding plate and comprising a light absorbing layer. A deflection portion is bending inwardly toward the reflecting layer and then extending outwardly to form a flat-shape positioning portion adhered to the reflection layer by an adhesive layer. The light source can project light toward the light guiding plate and pass part of the light from the light guiding plate to the deflection portion due to diaphaneity of the material of the transparent film. A light emitting area can be formed around the backlight module, lightening the connection port of the electronic device or other area needed to be lightened.

6 Claims, 3 Drawing Sheets

LIGHT EMITTING STRUCTURE AROUND A KEYBOARD BACKLIGHT MODULE

BACKGROUND OF THE INVENTION

1. Field of the Invention

The present disclosure relates to a light emitting structure around a keyboard backlight module, more particularly to a light blocking layer of the backlight module which utilize the diaphaneity of the material of the transparent film to enable the light emitting from the light guiding plate and entering the light blocking layer can pass through laterally, so a light emitting area can be formed at the peripheral of the backlight module to lighten a corresponding connection port of the electronic device for conveniently using plugging in/out.

2. Description of the Related Art

Current electric technology and information industry are developed rapidly, various electronic products are developed in a trend toward a light, thin, slim and small type but powerful functionality, such as computer, laptop computer, mobile internet device, smart phone, tablet computer, etc., which have become necessary electronic products for daily life or work of the modern people. The communication between the user and the electronic products are usually performed by using an input device such as mouse, or keyboard, etc. In practice, it is most convenient to operate the keyboard for inputting letter, number or instruction.

Moreover, in order to enable the user to clearly watch a symbol on each key under the environment with unsufficient light, some companies apply technologies of light guiding plate and light source in the keyboard, to develop a backlight keyboard provided with backlight module. The light generated by the backlight module can be projected to a backside of each of key caps to form a backlight effect, so the user can clearly watch the symbol on each of the key caps, and operate the keyboard conveniently. Currently, the backlight keyboard on the market includes a key module and a backlight module. The backlight module is provided with a light guiding plate, a light emitting unit having a flexible circuit board and a light emitting diode disposed above the light guiding plate and projecting light toward the light guiding plate to enable the light guiding plate lighting uniformly, a reflector disposed below the light guiding plate to reflect the light emitting from a lower surface of the light guiding plate to the light guiding plate, a light blocking plate disposed on the upper surface of the light guiding plate corresponding to the key module. Therefore, the light emitting from the light guiding plate can pass through the transparent portion of the light blocking plate to form a backlight on the key module.

However, please refer to FIG. 3 which is a partial section view of traditional backlight module. A reflecting plate A2 is disposed below the light guiding plate A1 of the backlight module A, and a light blocking plate A3 is disposed above the light guiding plate A1, an upper glue layer A31 and a lower glue layer A32 are formed on upper side surface and lower side surface of the light blocking plate A3, respectively. The upper glue layer A31 of the light blocking plate A3 is bound with a bottom plate B1 of the key module B, the lower glue layer A32 is bound with the light guiding plate A1, and the reflecting plate A2 is wrapped upwardly the surface of the peripheral of the light guiding plate A1 to combine integratedly.

However, in the general backlight module A, the reflecting plate A2 is used to wrap upwardly the peripheral of the light guiding plate A1, the material of the reflecting plate A2 is white and non-transparent material, so the light leaked from the peripheral of the light guiding plate A1 is reflected to form an upward light beam, so the light traveling within the light guiding plate A1 can be prevent from emitting from the peripheral of the backlight module A. By this way, the light projected from the light source can be prevent from emitting at the peripheral of the light guiding plate A1 to occur the light leakage. On the electronic device (such as laptop computer), multiple light emitting areas are usually formed on the connection ports at openings of the peripheral of the casing structure to enable the user to conveniently plug in/out these connection ports under dark or unsufficient light place or environment. However, in this structural design of using the reflecting plate A2 to stop the light of the light guiding plate A1 from emitting at the peripheral of the backlight module A, the connection ports at the openings of the casing structure or other area requiring light cannot be lightened, it causes that an extra light source must be disposed inside the casing structure, which affects the whole space configuration of the backlight module A or other members. What is need is to efficiently utilize the light source of the backlight module A to lighten the connection ports or other light emitting area, and further improve the flexibility of space design.

SUMMARY OF THE INVENTION

Main objective of the present disclosure is to provide a light source on at least one side of the light guiding plate of the backlight module, and provide a reflecting layer having flat shape on a side surface of the light guiding plate, and provide a transparent film of the light blocking layer on other side surface of the light guiding plate opposite to the reflecting layer, and provide a light absorbing layer on an outer surface of the transparent film. The transparent film is bent toward the reflecting layer at the peripheral of the light absorbing layer of the transparent film and adjacent to the light guiding plate, to form a deflection portion bent inwardly, and the transparent film is further extended outwardly to form a positioning portion having flat shape and adjacent to the reflecting layer. An adhesive layer is formed between the positioning portion and the reflecting layer, so the positioning portion of the reflecting layer can be bound on the surface of the reflecting layer by the adhesive layer, and has flat shape. An accommodating space is formed between the inside of the light blocking layer and the reflecting layer to enable the light blocking layer to downwardly cover the outside of said light guiding plate. While emitting light, the light emitting unit can project light toward the light guiding plate, and the light emitting from the lateral portion of the light guiding plate and entering the deflection portion can pass through due to diaphaneity of the material of the transparent film. Therefore, a light emitting area can be formed at the peripheral of the backlight module, to lighten the connection port of the casing structure of the electronic device, or other area which need to be lightened, so the user can plug conveniently.

Other objective of the present disclosure is to utilize the transparent film of the light blocking layer at peripheral of the backlight module to enable the light of the light guiding plate passing laterally through to form a light emitting area without disposing an extra light source and affecting space configuration of the backlight module or other member, whereby the flexibility of space design of the backlight module can be improved. In addition, the positioning portion of the light blocking layer can be bound on the surface of the reflecting layer by the adhesive layer, so that no adhesive is required between the light blocking layer and the bottom plate of the key module, the thickness of one layer can be omitted and whole thickness can be thinner, and the adhesive can be saved efficiently to further reduce the manufacturing cost.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1:
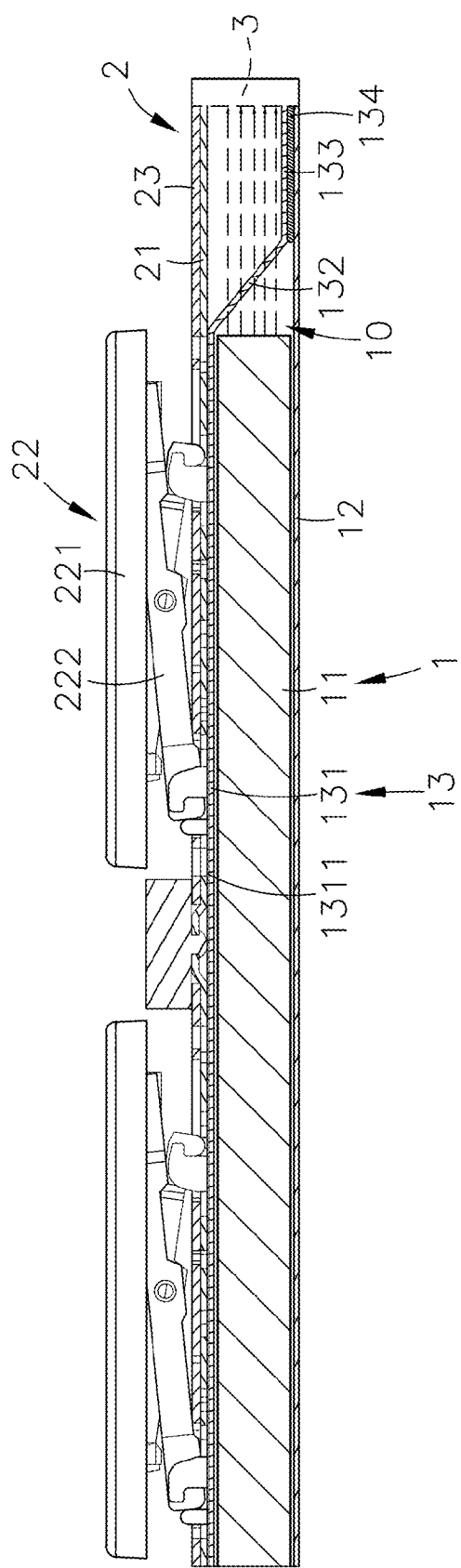
FIG. 1 is a lateral section view of a preferred embodiment of the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Figure 2:
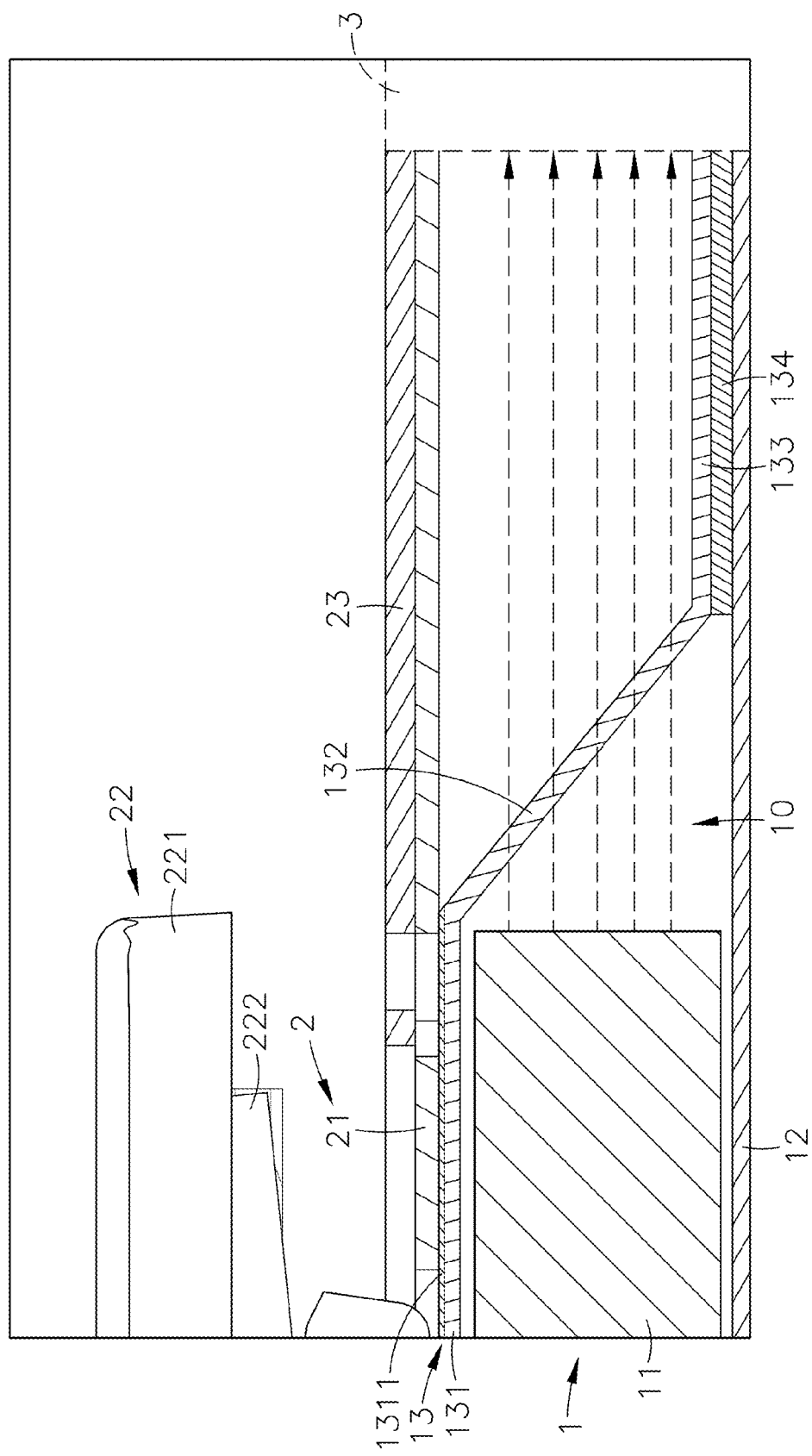
FIG. 2 is an enlarged local view of the FIG. 1 of the present disclosure.
Figure 3:
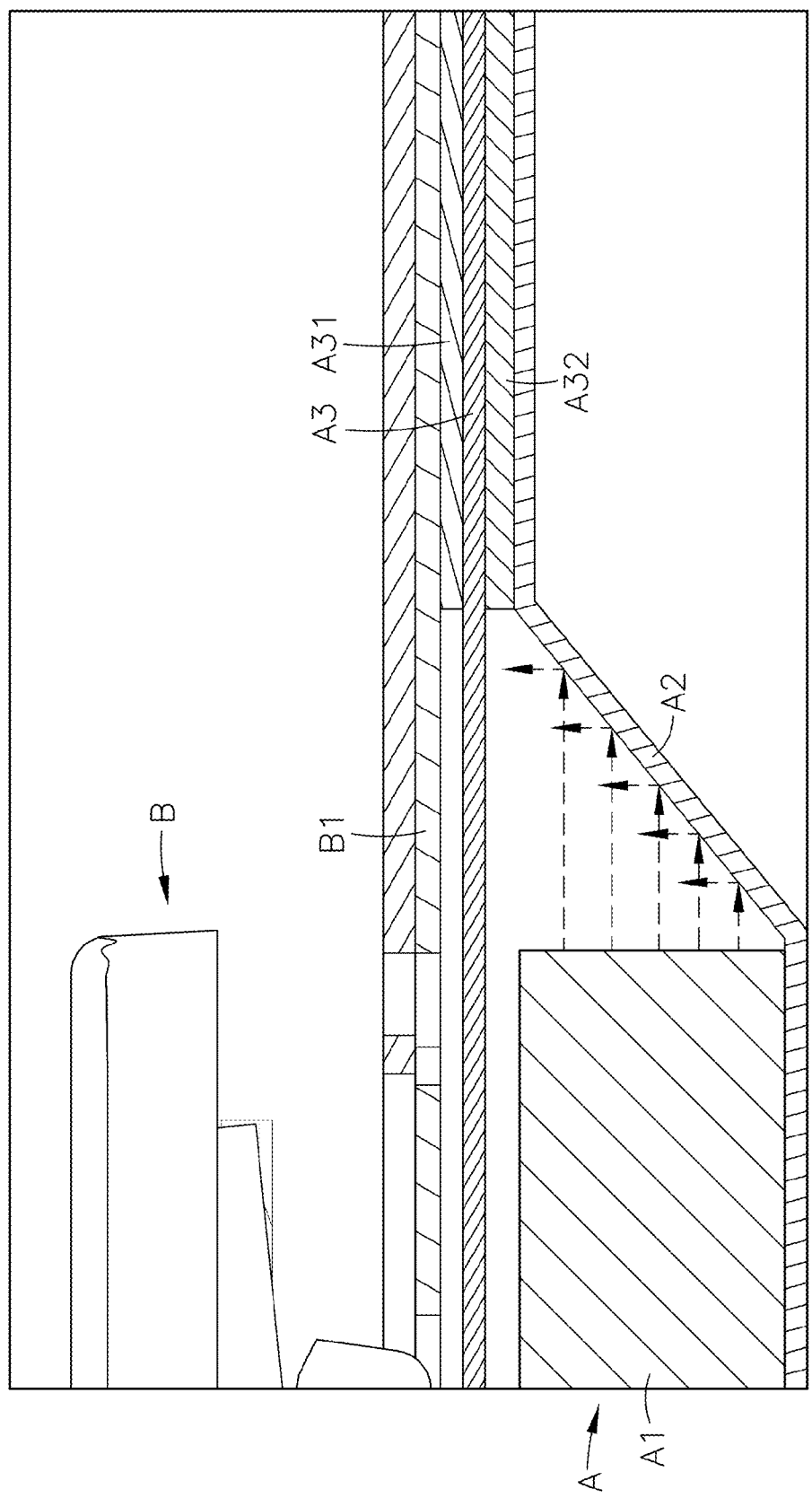
FIG. 3 is a partial lateral section view of a traditional backlight module.

Please refer to FIG. 1 and FIG. 2 which are lateral section view and enlarged local view of the FIG. 1 of a preferred embodiment of the present disclosure. As shown in FIG. 1 and FIG. 2, the present disclosure includes a backlight module 1 which is provided with a light guiding plate 11, a light source including a flexible circuit board and at least one light emitting unit (not shown in FIGs) is disposed at least one side of the flexible circuit board. Preferably, the light emitting unit is a light emitting diode connected electrically to the flexible circuit board, but the present disclosure is not limited thereto. In practical application, the light emitting unit can also be a small-scale light bulb, a light tube (such as CCFL) or other light emitting unit connected electrically with the flexible circuit board.

Moreover, a light blocking layer 12 having flat shape is disposed on a side surface of the light guiding plate 11 of the backlight module 1. The material of the reflecting layer 12 is white and non-transparent, and the reflecting layer 12 is abutted and positioned between the light guiding plate 11 and the flexible circuit board of the light source, or the reflecting layer 12 can be abutted and positioned with other side surface of the flexible circuit board opposite to the light guiding plate 11. Therefore, a plurality of light emitting units can be extended into the a first hollow part and a second hollow part (not shown in FIGs) corresponding to the light guiding plate 11 and the reflecting layer 12, and positioned therein. A light blocking layer 13 is disposed at other side surface of the light guiding plate 11 opposite to the reflecting layer 12, and includes a transparent film 131 which can be a MYLAR (PET polyester film). A light absorbing layer 1311 having flat shape is disposed on an outer side surface of the transparent film 131 and formed by coating printing ink or other light absorbing material on the outer side surface. The transparent film 131 is bent at peripheral of the light absorbing layer 1311 and adjacent to the light guiding plate 11 toward the reflecting layer 12 to form a deflection portion 132 which is bent inwardly and has extension shape, and then the transparent film 131 is further extended outwardly to formed a positioning portion 133 which is flat shape and adjacent to the reflecting layer 12.

An adhesive layer 134 is formed between the positioning portion 133 of the light blocking layer 13 and the reflecting layer 12 by a manner of coating, so the positioning portion 133 of the reflecting layer 12 can be bound with the reflecting layer 12 by the adhesive layer 134, and an accommodating space 10 for positioning the light guiding plate 11 can be formed between the inner of the light blocking layer 13 and the reflecting layer 12. A thickness of the light blocking layer 13 can be smaller than or equal to that of the reflecting layer 12. In addition, depending on practical requirement or different structural design, the light guiding plate 11, the flexible circuit board of the light source, the reflecting layer 12 and the light blocking layer 13 can respectively have a plurality of broken holes, through holes or transparent areas which correspond to each other, to facilitate the assembly or fixation of the backlight module 1 and other members of backlight keyboard.

The backlight module 1 of the present disclosure can be applied to a backlight keyboard, a key module 2 is further provided on the surface of the light blocking layer 13, and integrated with a casing structure of an electronic device (such as laptop computer, Ultrabook, etc.). The key module 2 includes a bottom plate 21, a plurality of key units 22, a thin film circuit board 23 and an elastic element (not shown in FIGs). The key units 22 are disposed on the bottom plate 21, and each has a key cap 221 and a linking mechanism 222 located between the key cap 221 and the bottom plate 21 to enable the key cap 221 to move up and down. Preferably, the linking mechanism 222 can be implemented by a scissors-structure keyswitch. The thin film circuit board 23 is disposed below or above the bottom plate 21 and the elastic element is disposed and positioned between the thin film circuit board 23 and a plurality of key units 22. Moreover, at least one light emitting area 3 is formed at peripheral of the reflecting layer 12, the light blocking layer 13 and the key module 2 of the backlight module 1, and corresponds to a USB connector, a HDMI port, a display port, a VGA port, an earphone jack, an audio port or other various connection port located at an opening of the casing structure of the electronic device.

When a user presses the surface of one of the key caps 221 of the key unit 22 by his/her finger for an input action, the pressed key cap 221 pushes down the elastic element to touch the thin film circuit board 23 to enable the contact points of circuit to contact with each other and form an electrical conduction, so a trigger signal corresponding to character symbol of the pressed key unit 22 is outputted to a controller of the backlight keyboard. However, there are many ways to design the structure of the key module 2 cooperating with the backlight module 1, and the detail of the structure is not technical feature of the present disclosure, so detailed description is omitted.

While emitting light, the light emitting unit of the light source of the backlight module 1 can project light toward the light guiding plate 11, to enable the light to transmit within the light guiding plate 11 for achieve uniform luminance. The light cannot pass through the reflecting layer 12, so the reflecting layer 12 can be used to reflect the light emitted from the lower surface of the light guiding plate 11 to the light guiding plate 11. The light traveling in the light guiding plate 11 can just pass the plurality of broken holes or transparent areas, etc., and then enter the key module 2 to pass through the plurality of key units 22 having diaphaneity to the external, so a nice light emitting effect on the backlight keyboard can be achieved.

Moreover, the transparent film 131 of the light blocking layer 13 of the present disclosure is bent inwardly toward the reflecting layer 12 to form the deflection portion 132, and the positioning portion 133 is bound and combined on the surface of the reflecting layer 12 to form a flat shape, so an accommodating space 10 is formed between the inner of the light blocking layer 13 and the reflecting layer 12 to enable the light blocking layer 13 to downwardly cover the outside of light guiding plate 11. While emitting light, the light emitting unit (not shown in FIGs) of the light source can project light toward the light guiding plate 11 to enable the light guiding plate 11 lighting uniformly, and the light emitting from the lateral portion of the light guiding plate 11 and entering the deflection portion 132 can pass through due to diaphaneity of the material of the transparent film 131. Therefore, at least one light emitting area 3 can be formed at the peripheral the reflecting layer 12, the light blocking layer 13 and the key module 2 of the backlight module 1, to lighten the connection port corresponding to the opening of the casing structure of the electronic device, or other area which need to be lightened, and further enable the user to operate the keyboard even at a dark or insufficient light place or environment. It is convenient for the user to plug a transmission line or connector of a flash drive, portable hard disk device, external CD-ROM drive or other device into the connection port for transmitting signal. The light emitting structure of the present disclosure does not need an extra light source disposed inside the casing structure of the electronic device, and does not affect the space configuration of the backlight module 1 or other members, so the flexibility of whole space design of the backlight module 1 can be improved. In addition, the positioning portion 133 of the light blocking layer 13 can be bound on the surface of the reflecting layer 12 by the adhesive layer 134 to form a flat shape, so that no adhesive is required between the light blocking layer 13 and the bottom plate 21 of the key module 2, the thickness of one layer can be omitted and whole thickness can be thinner, and the adhesive can be saved efficiently to reduce the manufacturing cost.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A light emitting structure around a keyboard backlight module, comprising a backlight module which is provided with a light guiding plate, a predetermined light source disposed at least one side of said light guiding plate to project light toward said light guiding plate to enable said light guiding plate lighting, and a reflecting layer having flat shape and disposed at a side surface of said light guiding plate, and a light blocking layer having at least one transparent film and disposed at other side surface of said light guiding plate opposite to said reflecting layer, a light absorbing layer formed on outer side surface of said transparent film, and a deflection portion formed by bending said transparent film at peripheral of said light absorbing layer and adjacent to said light guiding plate toward said reflecting layer, and said deflection portion bent inwardly to enable said light emitting from lateral portion of said light guiding plate to pass through to form a light emitting area at peripheral of said backlight module, a positioning portion having flat shape formed by extending said transparent film outwardly to adjacent to said reflecting layer, an adhesive layer formed between said positioning portion and said light blocking layer for binding said positioning portion and said reflecting layer.

2. The light emitting structure around a keyboard backlight module according to claim 1, wherein said transparent film of said light blocking layer of said backlight module is a MYLAR, and said light absorbing layer is formed by printing ink on said surface of said transparent film.

3. The light emitting structure around a keyboard backlight module according to claim 1, wherein said deflection portion formed by inwardly bending said light blocking layer of said backlight module has an extension shape.

4. The light emitting structure around a keyboard backlight module according to claim 1, wherein an accommodating space is formed between the inside of said light blocking layer of said backlight module and said reflecting layer to enable said light blocking layer downwardly cover the outside of said light guiding plate.

5. The light emitting structure around a keyboard backlight module according to claim 1, wherein thickness of said light blocking layer of said backlight module is smaller than or equal to that of said reflecting layer.

6. The light emitting structure around a keyboard backlight module according to claim 1, wherein said backlight module is further provided with a key module, and a plurality of key units and a thin film circuit board are disposed on a bottom plate of said key module, each of said key units has a key cap and a linking mechanism located between said key cap and said bottom plate to enable said key cap moving up and down, and said thin film circuit board is located below or above said bottom plate.

* * * * *